United States Patent [19]

Thomas

[11] Patent Number: 4,900,482
[45] Date of Patent: Feb. 13, 1990

[54] METHOD AND APPARATUS FOR BUCKLING CONTACT LENSES

[76] Inventor: Penrhyn F. Thomas, 3rd Floor 149 Castlereagh Street, Sydney NSW 2000, Australia

[21] Appl. No.: 79,662

[22] Filed: Jul. 29, 1987

[30] Foreign Application Priority Data

Jul. 29, 1986 [AU] Australia .............................. PH07175

[51] Int. Cl.$^4$ .............................................. B29D 11/00
[52] U.S. Cl. .................................... 264/2.7; 264/40.1; 264/339; 425/171; 425/383; 425/403.1; 425/808
[58] Field of Search ......................... 264/1.1, 2.7, 40.1, 264/339; 425/808, 171, 383, 403.1; 351/160 R, 160 H, 177

[56] References Cited

U.S. PATENT DOCUMENTS

| | | | |
|---|---|---|---|
| 3,005,234 | 10/1961 | Oriani et al. | 425/808 |
| 3,079,736 | 3/1963 | Kratt | 351/177 |
| 3,145,506 | 8/1964 | Vegors et al. | 351/160 R |

FOREIGN PATENT DOCUMENTS

| | | | |
|---|---|---|---|
| 2519708 | 11/1975 | Fed. Rep. of Germany | 351/160 R |
| 685759 | 1/1953 | United Kingdom | 351/160 R |
| 963407 | 7/1964 | United Kingdom | 351/177 |

Primary Examiner—James Lowe
Attorney, Agent, or Firm—Christie, Parker & Hale

[57] ABSTRACT

A method and apparatus for buckling contact lenses includes mounting a lens blank to be buckled on the contoured surface of a lens mounting tool so that the lens adopts a datum position, bringing a protruding element or elements into contact with the lens, such that the lens' contact point is coincident with the datum level, setting an indicator gauge to a setting to indicate the position of the contact point, moving the element or elements away from touch contact with the lens, setting a new elevation of the mounting tool by displacing the mounting tool over a distance commensurate with the predetermined degree of buckling of the lens required, and bringing the protruding element or elements into descending engagement with a portion of the lens, thereby buckling the lens to the shape of the contoured surface of the lens mount until the protruding elements have been displaced, the predetermined distance relative to the datum.

42 Claims, 4 Drawing Sheets

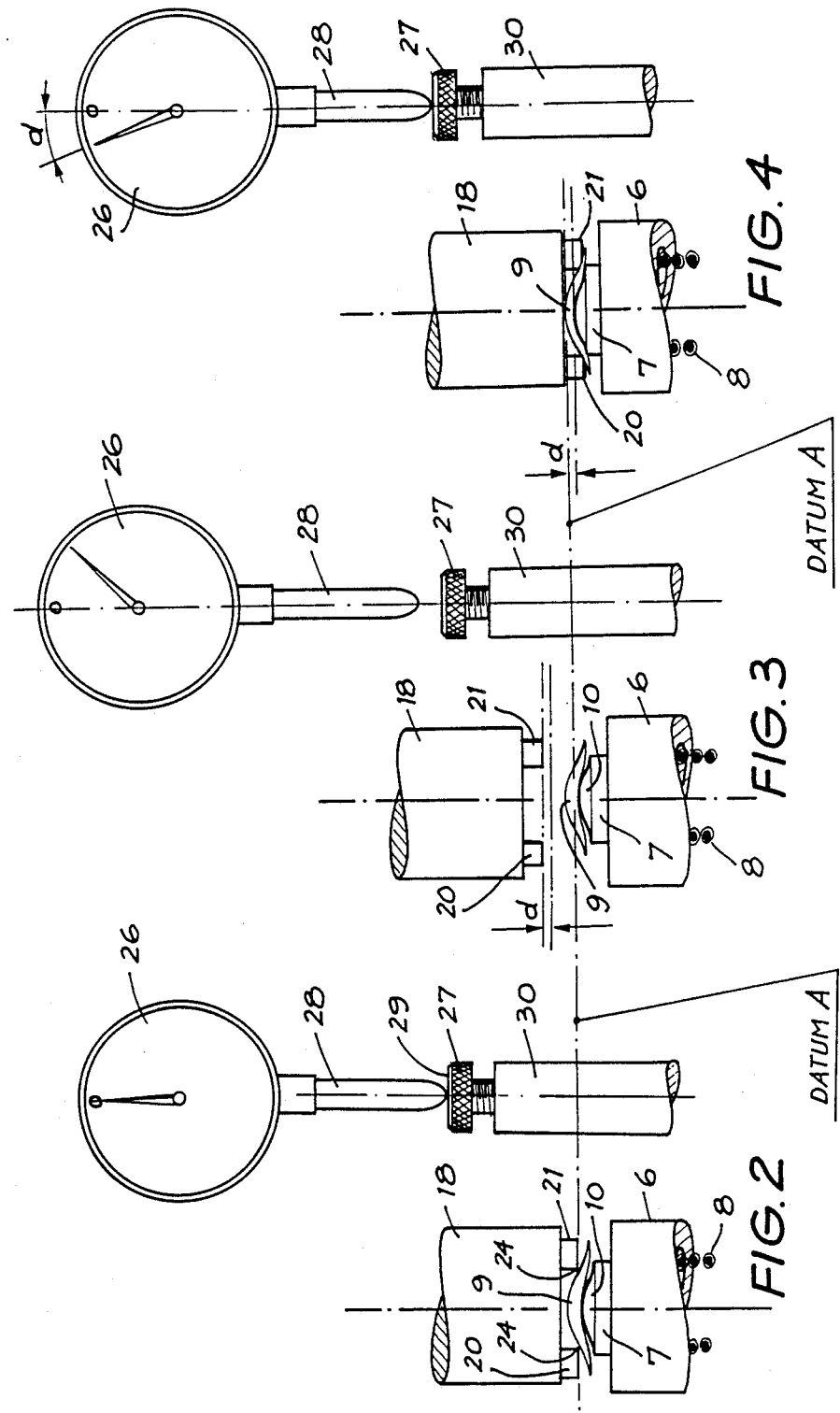

METHOD AND APPARATUS FOR BUCKLING CONTACT LENSES

FIELD OF THE INVENTION

The present invention comprises an improved method of buckling Toric Contact Lenses utilising a machine designed to buckle contact lens surfaces by a predetermined amount. More particularly the invention relates to a lens buckling machine which can be set so as to accurately buckle a lens according to a predetermined amount commensurate with the setting and according to prescription.

BACKGROUND OF THE INVENTION

In contact lens technology contact lenses are provided with a manufactured curvature and it is critical to the proper manufacturing and functioning of a contact lens that it be curved accurately. One reason for the need for accurate curvature is that the lens must locate on the eye such that there is no compression of the eye or eye blood vessels nor general eye discomfort caused to the wearer if the lens is inaccurately curved. The curvature is also critical to the particular astigmatic requirements of the eye.

The above problems can occur where the curve of the lens is not compatible with the radius of curvature of the particular eye surface of the wearer of the lens.

In addition, if the curvature of the lens is not accurately formed, decentering and wedging effects can be caused when it is on the eye. This can lead to eye damage and can affect the performance of the lens.

The critical zone of a contact lens is the optic zone located between the lens flange which is peripheral to the optic zone. The optic zone and flange meet at an interphase point known as a lenticulation on the outer surface of the lens. These various parts of the lens can be lathed out to different thicknesses from a blank which is formed from a polymer button. It is important that the optical zone be toroidal, and this is achieved by the curvature of the lens. The toric lens has an infinite number of powers to correspond to the particular power of the cornea of the eye.

The toricity of the lens must be constant for a particular lens.

The art of toric lens manufacture lies in the production of a lens which will be sufficiently accurate for the practitioner and which will sit with a tight degree of accuracy on the eye and which will be appropriate for the particular needs of the user. For these requirements to be achieved accurate curvature of the lens is essential.

Whilst there are a number of methods existing which are used for buckling lenses there are disadvantages which have been manifested with these prior art methods.

One of the commonly used methods of manufacture of toric contact lenses is to buckle the spherical surface of a lens blank by two pins located near the edge of the lens.

The buckled lenses are produced by crimping of the lens and by exerting lateral pressure exerted across the diameter of the lens. The stress is relieved from the lens when the crimping is released. When the lens is allowed to release the buckle is so created, a curve is thereby formed in the lens proportional to the degree of buckle or crimp applied.

The main problem with this method is that the buckle or crimp on the surface continually must be measured with a Radiuscope and the amount of buckle or crimp adjusted until the correct sagittal difference between the two meridians of the lens has been achieved.

This trial and error process is slow and tedious by comparison to the method and apparatus used in the present invention.

The present invention seeks to overcome the inefficiency of the prior art processes for buckling contact lenses by providing a means to produce an accurately curved toric surface lens according to prescription in a much shorter time.

By using the device and method of the present invention any number of lenses can be buckled to a preset degree with the same accuracy and without any further adjustment to the machine.

The invention also enables the speedy production of an unlimited number of buckled toric lenses of the same curvature by presetting the device to the required curvature.

Considerable production time and hence cost is saved because it is no longer necessary to make trial and error adjustments to the buckle for each individual lens until the desired lens curvature is produced.

In employing the prior art methodology uncrimping has always been a critical stage in lens manufacture, as the stress relieving can alter the curvature of the lens. This necessitates the use of the aforementioned monitoring Radioscope to continually read the crimping radii until the correct curvature has been achieved.

Using the machine of the present invention it will no longer be necessary to constantly monitor the lens radii, as this is accurately set by the machine itself in accordance with the degree of buckling.

It has previously been difficult to ensure that the lens to be crimped is crimped exactly along the meridian of the lens.

The present invention by virtue of the facility for pre-setting of the machine and the method of buckling used eliminates this problem.

With the present invention, it is now possible to mass produce astigmatic contact lenses using a buckling machine without the need for constant adjustment of the machine each time a lens is buckled except when a variation in the astigmatic lens is required.

SUMMARY OF THE INVENTION

In its broadest form the present invention comprises:
a lens mounting tool adapted to receive and support a lens,
a descending and ascending device for engaging at least a portion of said lens when said device is on a descending stroke,
a means to manually control the altitude of said device relative to said buckling tool,
a means for setting and adjusting the bottommost position of the travel of said device relative to said mounting tool and to a datum point, wherein when a lens is mounted on said mounting tool for buckling, said engaging means engage said portion of said lens when said driving die descends, thereby buckling said lens about said mounting tool according to a predetermined and preset bottommost position of travel of said device.

In an alternative embodiment form the present invention comprises a lens buckling machine comprising:
a primary support platform, a lens mounting tool disposed in a receptacle engaging with said platform, said mounting tool being adapted to receive a lens for buckling, a means to enable variation in and presetting of the elevation of at least a lens mounting portion of said mounting tool relative to said platform, a descending driving die having means for engaging an annular flange on said lens when said die is on a descending stroke, a means to control the degree of descent of said driving die, a gauge means for measuring the degree of descent of said driving die, wherein when said lens is mounted on said mounting tool the action of said lens engaging means on said lens on a downward stroke of said driving die causes said lens to be buckled to a predetermined amount according to the predetermined setting of said buckling tool.

In an alternative form the invention comprises:

a lens mounting tool having a contoured surface adapted to receive and support a lens, a means for elevational adjustment of said contoured surface, a driving die adapted to ascend and descend and having means to engage at least a portion of said lens during a descending stroke of said die, and means for measuring and controlling the descent of said die to achieve a predetermined buckling of said lens, whereby, when a lens is to be buckled, said die travels on a descending stroke so that said lens engaging means engages said portion of said lens thereby buckling said lens.

In the broadest form of the method aspect of the invention, the invention comprises:
(a) Mounting a lens blank on a lens mounting tool such that the lens is at a datum elevation,
(b) bringing an element or elements which downwardly depend from a supporting device into engagement with said lens,
(c) adjusting the elevational position of said element or elements according to the degree of buckling required or adjusting the elevational position of said mounting tool according to the degree of buckling required,
(d) continuing said downward movement of said element or elements to a preset and predetermined position relative to said datum thereby buckling said lens about said mounting tool.

In a further form of the method aspect of the present invention, the invention comprises:

a method for buckling a lens using a buckling machine, said buckling machine comprising:
(a) Mounting a lens blank on a lens mounting tool which is set at a datum elevation,
(b) bringing a protruding element or elements which downwardly depend from a descending die into contact with a peripheral flange on said lens whilst said tool is set at said base elevation,
(c) setting a die travel indicator gauge at zero,
(d) elevating said descending die away from said lens flange,
(e) elevating said lens mounting tool relative to said base elevation according to a predetermined buckling distance,
(f) returning said descending die and said protruding element or elements into descending engagement with the flange of said lens until said element or elements reach said base elevation thereby buckling said lens according to said predetermined buckling distance.

In another form of the method aspect of the invention, the invention comprises:
(a) Mounting a lens blank on a lens mounting tool such that the lens is at a datum elevation,
(b) bringing an element or elements which downwardly depend from a supporting die into engagement with said lens,
(c) adjusting the elevational position of said element or elements according to the degree of buckling required or adjusting the elevational position of said mounting tool according to the degree of buckling required,
(d) continuing said downward movement of said element or elements to a preset and predetermined position relative to said datum thereby buckling said lens about said mounting tool.

In one embodiment the lens mounting tool is centrally mounted on a horizontal platform having legs allowing access beneath the platform to a setting gauge on the mounting tool. The dial enables the mounting tool to be variable in elevation relative to the platform. In an alternative embodiment the setting gauge is located on a driving die platform above the mounting tool so the elevation of the die can be moved relative to the buckling tool.

Preferably, the driving die is mounted directly above the mounting tool in axial alignment with a lens when mounted on the mounting tool. The driving die is mounted on a platform which is in turn mounted on a shaft to facilitate ascending and descending motion of the die. The shaft is fixed to the platform for rigid support.

In addition a gauge is connected to the die to enable a visual indication of the amount of downward displacement of the die commensurate with full and predetermined buckling of the lens. The gauge is provided with a probe which is adapted to engage a stopper on the platform. The gauge provides a visual indication of the point at which the lens if fully buckled.

Preferably the die is actuated manually by means of a handle.

The invention will now be described in detail according to a preferred but non limiting embodiment and with reference to the accompanying drawings.

DRAWINGS

FIG. 1 shows an isometric view of the buckling machine according to a preferred embodiment of the invention, FIG. 2 shows an enlarged view of a portion of the buckling machine whereby the buckling pins are set to a datum level prior to setting the buckling distance, FIG. 3 shows an enlarged view of the buckling machine showing the buckling pins set above the lens prior to buckling, FIG. 4 shows the changed position of the buckling pins when the lens is fully buckled, FIG. 5 shows an enlarged view of the buckling pins in alignment with a lens, and FIG. 6 shows the buckling machine according to an alternative embodiment wherein the vernier setting gauge is positioned such that the buckling distance is set by raising the mounting tool instead of lowering the platform assembly.

DETAILED DESCRIPTION

Figure 1:
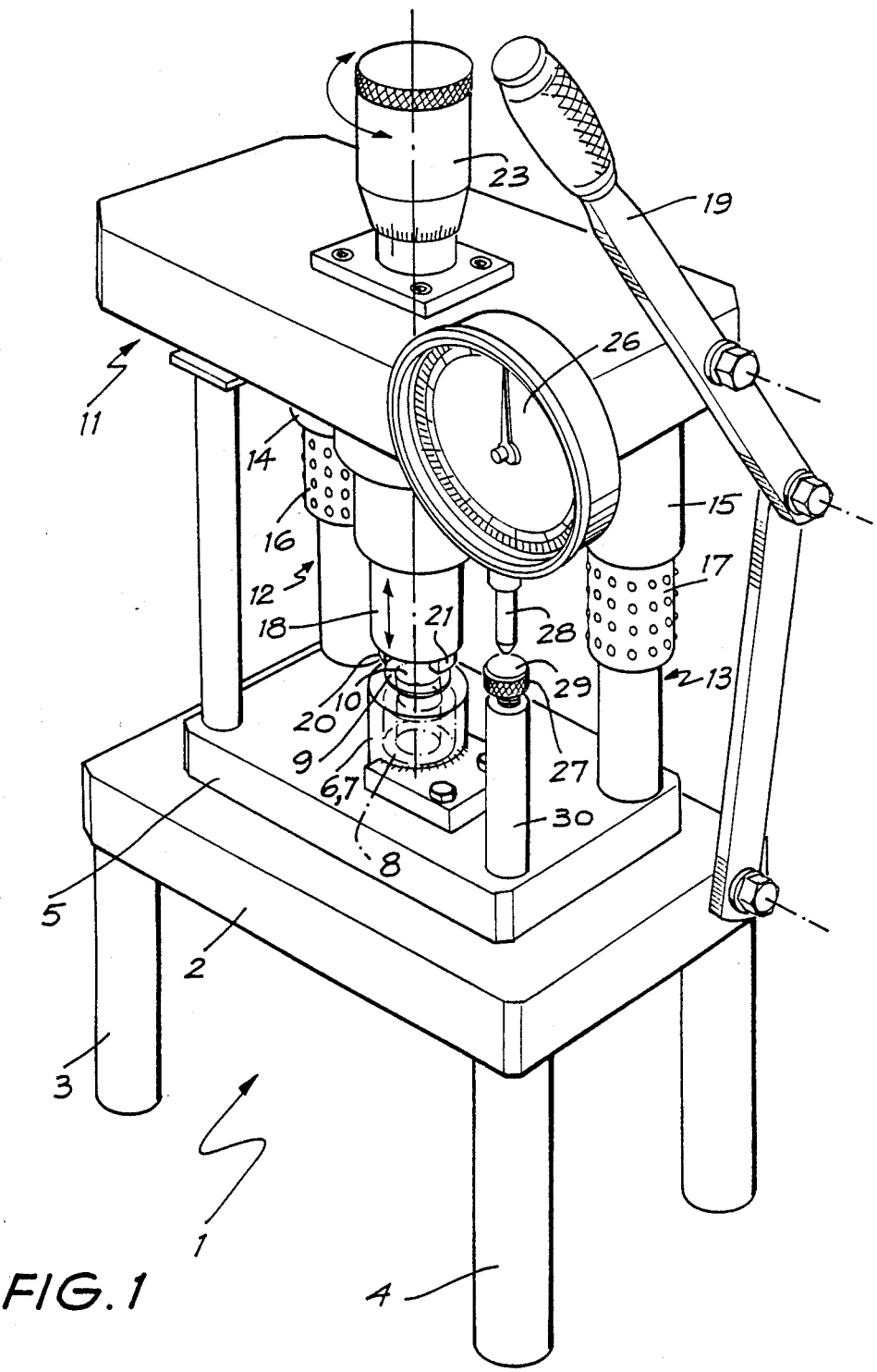

Referring to FIG. 1 there is shown a lens buckling machine 1 according to a preferred embodiment of the invention having a primary supporting platform 2 which is supported typically by leg pairs 3 and 4. Located on the platform 2 is a secondary platform 5 which supports a cylindrical housing 6. The housing 6 is adapted to receive a lens mounting tool 7 and also has a heating element 8 therewithin for the purpose of heating the lens mounting tool 7 and consequently a lens 9 mounted on contoured lens mount 10.

Located above the lens mounting tool is a platform assembly 11. The assembly is mounted on guide posts 12 and 13 each of which comprise telescopic sleeves 14 and 15 which are proportioned to slide with the assistance of bearing cylinders 16 and 17. The platform assembly 11 is also adapted with a driving die 18 whose central axis is axially aligned with the central axis of the mounting tool 7. The travel of the die along the central axis is maintained by the positioning of the platform on the guide posts 12 and 13. Actuation of the platform assembly is facilitated by means of articulated handle 19.

Figure 5:
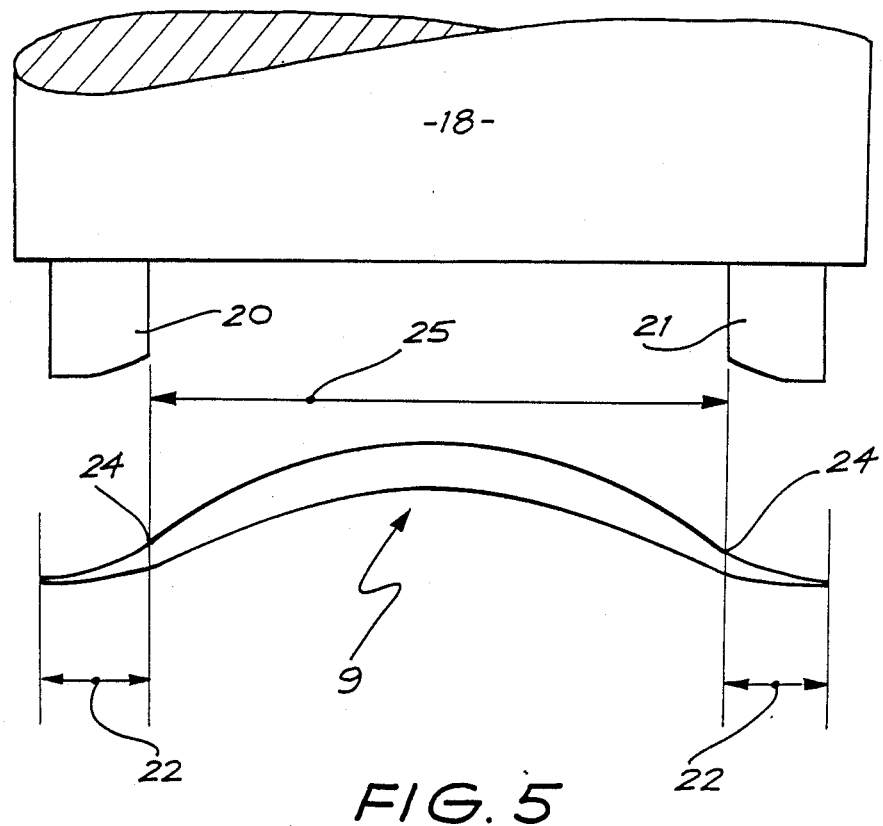

The driving die 18 is adapted with buckling pins 20 and 21 which engage the lens flange 22 (see FIG. 5).

Superimposed above the platform assembly is a vernier screw gauge 23 which is for the purpose of setting the required buckling distance of the lens according to prescription.

The methodology of the buckling machine will now be described in detail according to the proceedural steps and with reference to FIGS. 2, 3 and 4.

Referring to FIG. 2 the machine is shown with the buckling pins 20 and 21 brought into touch engagement with the interphase line between the lens flange and the optic zone 25 known as the lenticulation 24 (see FIG. 5).

The point at which the pins contact the lenticular surface is designated as datum level A. This datum constitutes a reference point for setting of the buckling distance by means of the vernier gauge 23.

When the pins are at this point the gauge 26 is set at zero by means of adjusting screw 27. At this time, the probe 28 impinges upon upper surface 29 adjusting screw 27. The zero setting is visually indicated by the needle position on gauge 26. The lens is then heated in preparation for buckling by means of the heating element 8 which is located in the housing 6. The heating element 8 heats the buckling tool which in turn heats the lens, enabling the lens to be put in a condition which is receptive to buckling.

Once the zero position has been set, the platform assembly 11 is lifted above and away from the lens leaving a separation between the pins 20 and 21 and the lens 9 as shown in FIG. 3.

At this position, the vernier screw gauge 23 is adjusted according to the required degree of lens buckle. This has the effect of lowering the buckling pins to a distance commensurate with the required degree of buckling of the lens. The distance that the platform is lowered is relative to the original datum level A, and this distance is indicated by d in FIG. 3.

Once the vernier gauge has been set the buckling pins 20 and 21 are lowered onto the lens by manual operation of the articulated handle 19. The pins are thus lowered until they can proceed no further which indicates that the required degree of buckling of the lens has taken place as shown in FIG. 4.

The pins 20 and 21 are manually lowered onto the lenticulation 24 of the lens 9. They are lowered until they cannot move any further due to probe engagement with stop post 30.

When the pins have been moved through distance d (see FIG. 4) the lens 9 is fully buckled to the required degree. Gauge 26 visually indicates when the distance 'd' has been travelled, indicating that full lens buckling has taken place.

Whilst the buckling machine is set at this setting, until it is altered, an infinite number of lenses can be buckled to the same degree of buckling. This represents a significant advance over the prior art as it is not necessary using this machine to check the lens buckle with a radiuscope either during the buckling process or at the end of the buckling process.

Figure 6:
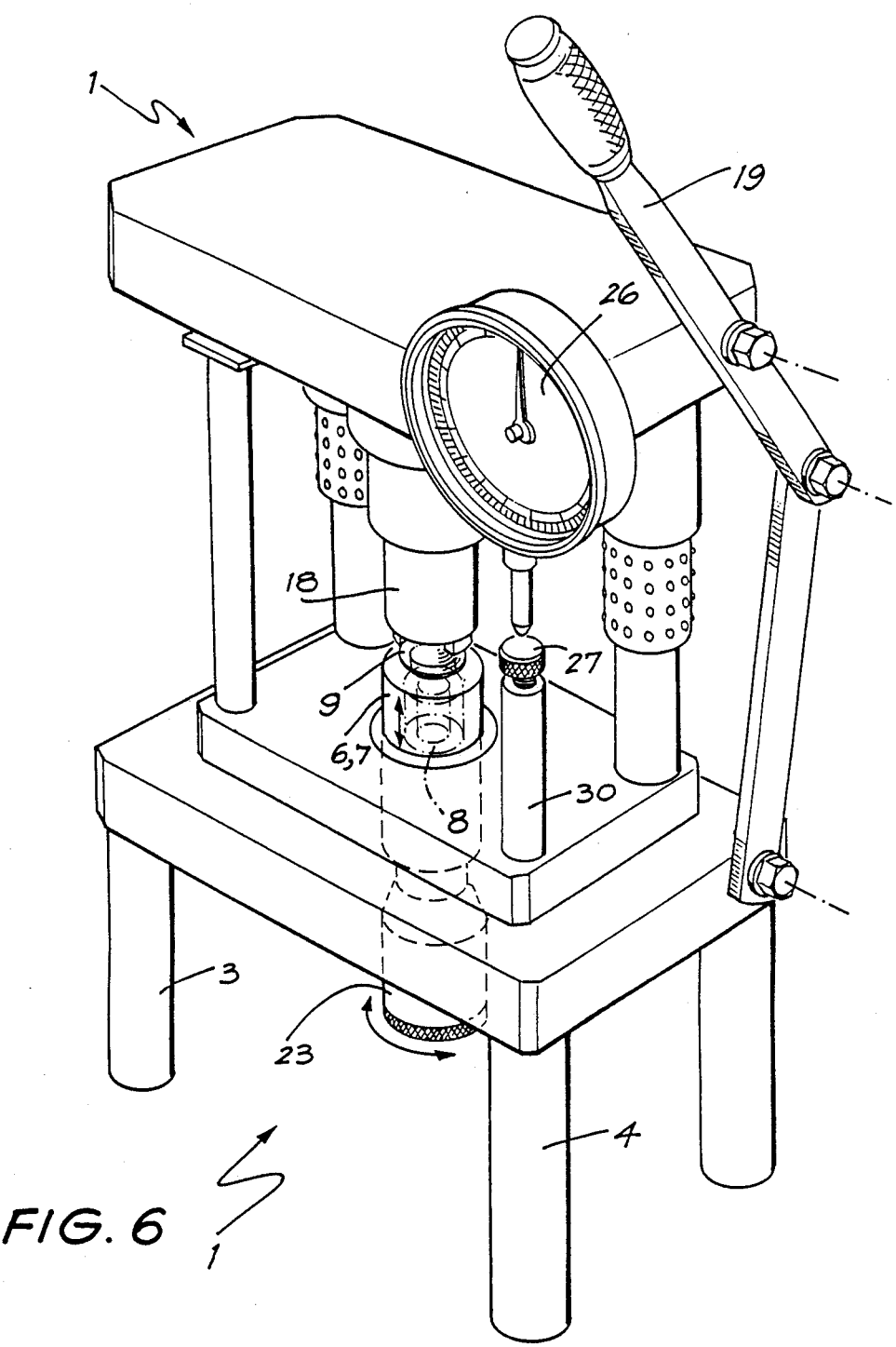

It will be recognised by persons skilled in the art that numerous variations and modifications can be made to the invention without departing from the overall spirit and scope of the invention as broadly described herein. For instance, as shown in FIG. 6 in an alternative embodiment the vernier gauge can be located near the platform 2 so that instead of lowering the die 18 by the vernier adjustment, the mounting tool can be elevated relative to datum level A by the vernier adjustment. When this is done, no fine adjustment of the die or die platform is required as the distance 'd' relative to the datum is travelled by the mounting tool.

What is claimed is:

1. A lens buckling machine comprising:
    a lens mounting tool having a contoured surface adapted to receive and support a lens,
    a descending and ascending device having means for engaging at least a portion of the said lens by touch contact when said device is on a descending stroke,
    a means to manually adjust the altitude of said device relative to said lens mounting tool, and
    a means for setting and adjusting the bottommost position of the travel of said device relative to said mounting tool and to a datum point, wherein when a lens is mounted on said contoured surface of said lens mounting tool for buckling, said engagement means engage said portion of said lens by touch contact when said descending and ascending device descends, thereby buckling said lens about said contoured surface of said lens mounting tool according to a predetermined and preset bottom most position of travel of said device.

2. A lens buckling machine according to claim 1 wherein the said descending and ascending device comprises a die having engaging pins which downwardly depend from said die in the direction of said lens.

3. A lens buckling machine according to claim 2 wherein the means of controlling the altitude of said die is provided by the die riding on a first platform which ascends and descends on telescopic guide posts in response to said manual control.

4. A lens buckling machine according to claim 3 wherein the said die, mounting tool and said means for setting and adjusting the bottommost position of travel are supported by a primary support structure.

5. A lens buckling machine according to claim 4 wherein the lens mounting tool is housed in a receptacle which is supported by a supporting platform which forms part of the primary support structure.

6. A lens buckling machine according to claim 5 wherein the central axis of said die and the central axis of said mounting tool are in axial alignment with the central axis of a lens when mounted on said mounting tool.

7. A lens buckling machine according to claim 6 wherein each of said engaging pins have a radiused inner edge which engages with and conforms to the shape of at least a portion of a peripheral flange portion of said lens during bending of said lens.

8. A lens buckling machine according to claim 7 wherein the lens mounting tool has a lens mount, the contour of the lens mount substantially conforming to the shape of the back concave surface of the lens.

9. A lens buckling machine according to claim 8 further comprising an indicator gauge means for indicating the degree of descent or ascent of said die.

10. A lens buckling machine according to claim 9 wherein the said gauge means is interconnected with said die and also has a detection probe which engages with a stopper on said first platform when said pins are at their bottom most position and when said lens is in the fully buckled position.

11. A lens buckling machine according to claim 10 wherein the means for setting and adjusting the bottom most position of travel of said die comprises a rotatable vernier gauge engaging with said lens mounting tool such that when said gauge is rotated the elevation of said mounting tool is adjusted according to the degree of rotation of said gauge.

12. A lens buckling machine according to claim 10 wherein the means for setting and adjusting the bottom most position of travel of said die comprises a rotatable vernier gauge engaged with said die such that when said gauge is rotated the elevation of said die is adjusted according to the degree of rotation of said gauge.

13. A lens buckling machine according to claim 11 wherein the said mounting tool is adapted for travel between a first position and a second preselected position.

14. A lens buckling machine according to claim 12 wherein the said mounting tool is adapted for travel between a first position and a preselected second position.

15. A method for buckling contact lenses comprising the steps of:
 (a) mounting a lens blank to be buckled on a lens mounting tool such that the lens adopts a datum position,
 (b) bringing a protruding element or elements into touch contact with said lens, such that the contact point is coincident with the datum level,
 (c) setting an indicator gauge to a setting to indicate the position of the contact point,
 (d) moving the said element or elements away from touch contact with the lens,
 (e) setting a new elevation of the mounting tool by displacing said mounting tool over a distance commensurate with the predetermined degree of buckling of the lens required, and
 (f) bringing said protruding element or elements into descending engagement with a portion of the lens thereby buckling the lens until the protruding elements have been displaced the predetermined distance relative to the datum.

16. A method according to claim 15 wherein the said mounting tool provides a fulcrum about which said lens is buckled.

17. A method according to claim 16 wherein the protruding element or elements depend downwardly from a supporting die which is adapted for descending and ascending movement.

18. A method according to claim 17 wherein the engagement between the said elements and the said lens is effected by manual adjustment of the said elements.

19. A method according to claim 18 wherein the said elements comprise two spaced apart pins which engage a flange on the lens during bending and which are mounted on a die adapted for ascending and descending movement.

20. A method according to claim 18 wherein the central axis of the said die, the central axis of the mounting tool and the central axis of the lens when mounted on the mounting tool are in axial alignment.

21. A method for buckling a contact lens comprising the steps of:
 (a) Mounting a lens blank on a lens mounting tool,
 (b) setting said tool so that said lens is at a datum elevation,
 (c) introducing an element or elements which downwardly depend from a supporting die into contact with said lens,
 (d) setting an element travel indicator gauge at zero,
 (e) raising said elements away from said lens,
 (f) elevating said lens mounting tool to a preselected elevation above said datum elevation,
 (g) heating said mounting tool and thereby said lens to a predetermined temperature,
 (h) lowering said elements into engagement with said lens until said elements reach said datum elevation then further lowering said elements to a point commensurate with said preselected elevation thereby buckling said lens.

22. A method for buckling a contact lens comprising the steps of:
 (a) Mounting a lens blank on a lens mounting tool such that the lens is at a datum elevation,
 (b) bringing an element or elements which downwardly depend from a supporting device into engagement with said lens,
 (c) adjusting the elevational position of said element or elements according to the degree of buckling required or adjusting the elevational position of said mounting tool according to the degree of buckling required,
 (d) continuing said downward movement of said element or elements to a preset and predetermined position relative to said datum thereby buckling said lens about said mounting tool.

23. A method for buckling contact lenses comprising the steps of:
 (a) mounting a lens blank to be buckled on a lens mounting tool such that the lens adopts a datum position,
 (b) bringing a protruding element or elements into touch contact with said lens, such that the contact point is coincident with the datum level,
 (c) setting an indicator gauge to a setting to indicate the position of the contact point,
 (d) moving the said element or elements away from touch contact with the lens,
 (e) setting a new elevation of the protruding elements by displacing the protruding elements over a distance commensurate with the predetermined degree of buckling of the lens required, and
 (f) bringing said protruding element or elements into descending engagement with a portion of the lens, thereby buckling the lens until the protruding elements have been displaced the predetermined distance relative to the datum.

24. A method according to claim 23 wherein the said mounting tool provides a fulcrum about which said lens is buckled.

25. A method according to claim 24 wherein the protruding element or elements depend downwardly from a supporting die which is adapted for descending and ascending movement.

26. A method according to claim 25 wherein the engagement between the said elements and the said lens is effected by manual adjustment of the said elements.

27. A method according to claim 26 wherein the said elements comprise two spaced apart pins which engage a flange on the lens during bending and which are mounted on a die adapted for ascending and descending movement.

28. A method according to claim 26 wherein the central axis of the said die, the central axis of the mounting tool and the central axis of the lens when mounted on the mounting tool are in axial alignment.

29. A lens buckling machine comprising:
a lens mounting tool adapted to receive and support a lens,
a descending and ascending device for engaging at least a portion of said lens when said device is on a descending stroke,
a means to manually adjust the altitude of said device relative to said mounting tool, and
a means for setting and adjusting the bottommost position of the travel of said device relative to said mounting tool and to a datum point,
the descending and ascending device comprising a die having engaging pins which downwardly depend from said die in the direction of said lens, wherein when a lens is mounted on said lens mounting tool for buckling, said engaging pins engage said portion of said lens when said descending and ascending device descends, thereby buckling said lens about said lens mounting tool according to a predetermined and preset bottom most position of travel of said device.

30. A lens buckling machine according to claim 29 wherein the means of controlling the altitude of said die is provided by the die riding on a first platform which ascends and descends on guide posts in reference to said manual control.

31. A lens buckling machine according to claim 30 wherein the said die, mounting tool and said means for setting and adjusting the bottom most position of travel are supported by a primary support structure.

32. A lens buckling machine according to claim 31 wherein the lens mounting tool is housed in a receptacle which is supported by a supporting platform which forms part of the primary support structure.

33. A lens buckling machine according to claim 32 wherein the central axis of said die and the central axis of said mounting tool are in axial alignment with the central axis of a lens when mounted on said mounting tool.

34. A lens buckling machine according to claim 33 wherein each of said downwardly depending pins has a radiused inner edge which engages with and conforms to the shape of at least a portion of a peripheral flange portion of the lens during bending of said lens.

35. A lens buckling machine according to claim 34 wherein the lens mounting tool has a lens mount, the contour of the lens mount substantially conforming to the shape of the back concave surface of the lens.

36. A lens buckling machine according to claim 35 further comprising an indicator gauge means for indicating the degree of descent or ascent of said die.

37. A lens buckling machine according to claim 36 wherein the said gauge means is interconnected with said die and also has a detection probe which engages with a stopper on said first platform when said pins are at their bottom most position and when said lens is in the fully buckled position.

38. A lens buckling machine according to claim 37 wherein the means for setting and adjusting the bottom most position of travel of said die comprises a rotatable vernier gauge engaging with said lens mounting tool such that when said gauge is rotated the elevation of said mounting tool is adjusted according to the degree of rotation of said gauge.

39. A lens buckling machine according to claim 37 wherein the means for setting and adjusting the bottom most position of travel of said die comprises a rotatable vernier gauge engaged with said die such that when said gauge is rotated the elevation of said die is adjusted according to the degree to rotation of said gauge.

40. A lens buckling machine according to claim 38 wherein the said mounting tool is adapted for travel between a first position and a second preselected position.

41. A lens buckling machine according to claim 39 wherein the said mounting tool is adapted for travel between a first position and a preselected second position.

42. A lens buckling machine according to claim 1 wherein the central axis of the engaging means and the central axis of said lens mounting tool are in axial alignment with the central axis of a lens when mounted on the lens mounting tool.

* * * * *